United States Patent [19]
Xu et al.

[11] Patent Number: 6,069,690
[45] Date of Patent: May 30, 2000

[54] INTEGRATED LASER IMAGING AND SPECTRAL ANALYSIS SYSTEM

[75] Inventors: James J. Xu, San Jose; Bruce Worster, Saratoga; Ken K. Lee, Los Altos, all of Calif.

[73] Assignee: Uniphase Corporation, San Jose, Calif.

[21] Appl. No.: 09/191,602

[22] Filed: Nov. 13, 1998

[51] Int. Cl.[7] .............................. G01J 3/44; G01N 21/65; G01N 21/88

[52] U.S. Cl. ......................... 356/73; 356/301; 356/237.3; 356/237.4

[58] Field of Search .......................... 356/301, 73, 237.2, 356/237.3, 237.4

[56] References Cited

U.S. PATENT DOCUMENTS

| | | | |
|---|---|---|---|
| 5,329,352 | 7/1994 | Jacobsen | 356/301 |
| 5,479,252 | 12/1995 | Worster et al. | 356/237 |

OTHER PUBLICATIONS

Product Specification entitled "Labram Contents", EG&G Instruments, Jun. 1994, 51 pages.

Preliminary User's Manual entitled "Laser Imaging System With Micro–Raman/PL", Ultrapointe Corporation, 1998, 7 pages.

Product Brochure entitled Raman Imaging Microscope, Renishaw plc, , Transducer Systems, Division, Gloucestershire UK, 1992, 5 pages.

*Primary Examiner*—F. L. Evans
*Attorney, Agent, or Firm*—Skjerven, Morrill, MacPherson, Franklin & Friel LLP; Alan H. MacPherson; Daniel P. Stewart

[57] ABSTRACT

A system for analyzing an object has two operating modes such as scanned imaging mode and stop scan spectral analysis mode. A beam scanner is optically connected to a laser to receive laser beams from the laser. Beam scanner also scans the beams if the system is in the scanned imaging mode. A lens (e.g., an objective lens) is optically coupled to the beam scanner to focus the beams received from the beam scanner. A sensor is optically coupled to the lens to receive the beams that reflect from the object. The sensor may detect characteristics of the beam such as color and intensity. A spectrometer is optically coupled to the objective lens. During stop scan spectral analysis mode, spectrometer generates wavelength spectrum data.

10 Claims, 2 Drawing Sheets

INTEGRATED LASER IMAGING AND SPECTRAL ANALYSIS SYSTEM

BACKGROUND OF THE INVENTION

1. Field of the Invention

This invention relates to optics and, in particular, to an integrated laser imaging and spectral analysis system.

2. Related Art

Semiconductor chip manufacturers have increasingly sought to improve die yields in their production processes even with ever decreasing minimum feature sizes ("die yield" is defined as the percentage of final working dies to total attempted dies). Key to this effort is the examination of the physical features (e.g., defects) of the semiconductor wafer.

Defects are classified broadly as particulate or process flow defects. Particulate defects are undesired particles that sometimes become attached to the surface of a wafer due to contamination in the wafer processing environment. Process flow defects are differences between the actual and desired process result. The examination of particulate defects is important to determine the impact of such contamination on future process steps and ultimately on the functionality of the final die package. The examination of process flow defects is important in determining if the process is acceptable or requires furthermore recipe modifications. As minimum feature sizes continue to get smaller well into the sub-micron range, the ability to evaluate ever smaller defects on a wafer has become of paramount importance to achieving high yields.

To detect defects, instrument suppliers developed wafer scanners which scan wafers for anomalous optical sites that are characteristics of defects. In one type of wafer scanner, called a "laser scanning system", a laser beam is focused on and scanned over the surface of a test chip. Anomalous optical sites are identified by comparing the light scatter from locations on known good chips to the light scatter from the test chip. If the two light scatters are different, an anomalous optical site is detected.

In another type of wafer scanner, called a "video system", a video picture of the surface of a known good chip is taken and compared to a corresponding video picture taken of a test chip using, for example, white light imaging. For each pixel, a difference is calculated between pixel values of the known good chip image and the corresponding pixel values of the test chip image. If the difference is greater than a predetermined threshold, an anomalous optical site is identified.

As these wafer scanners were developed, the need to identify positively the defect nature (e.g., defect material, type, size, and precise location) was not appreciated. The defect nature can be used to determine the origin of the defect. The number, location and size of the defects can be used to calculate the density of defects, and, along with the defect type, the density of particular defect types can be calculated. This information can then be used to more closely monitor and/or to modify processing environment conditions and process steps in the chip production process.

As the need for more precise defect analysis has become apparent, semiconductor manufacturers have needed the ability to "revisit" defects to identify the nature, location and size of defects found by the above-described wafer scanners. This need has led to review stations that are based on laboratory microscopes with precision wafer handling stages that allow an operator to close in on and evaluate the previously detected defects. Revisiting of the defects by the review stations is done off-line from the defect detection process so as not to limit the throughput of the wafer scanners. Little engineering was done in the design of these review stations. For example, the review stations typically use off-the-shelf, visible light, research-style microscopes.

The off-the-shelf microscopes currently being used in defect review stations lack sufficient resolution to resolve sub-micron defects. Visible light confocal scanning microscopes (both white light and laser-based) that are built by modifying off-the-shelf microscopes can improve the resolution due to the inherent properties of confocal imaging which eliminates light from out of focus portions of the sample, improves the inherent point resolution characteristics, and in the case of a laser confocal, uses a single wavelength to eliminate chromatic aberrations. However, the use of such microscopes increases the risk of contamination of the semiconductor chips during the review process, since a human is relatively dirty by cleanroom standards and is in close proximity to the wafer surface when using the microscope. Furthermore, the presence of the microscope causes turbulent flow of the air near the wafer which tends to pull in nearby contaminants to the wafer.

The semiconductor industry has used scanning electron microscopes (SEMs) that provide increased resolution and perform energy dispersive X-ray (EDX) analysis. In EDX analysis, X-rays are directed toward the surface of the semiconductor chip. By measuring the wavelength spectrum of the reflected light, information can be gleaned regarding the types of material present on the wafer surface.

Unfortunately, EDX analysis requires high voltage (up to approximately 40,000 volts) SEMS. Furthermore, bombardment of the wafer surface with electrons from high voltage SEMs damages the wafer, thereby decreasing die yield.

Recently, low voltage SEMs (100–1000 volts) have seen limited use in wafer fabs for "critical dimension" measurements of line widths. However, low voltage SEMs are too slow to use except on a sample basis, and, in addition, provide no analytical (e.g., EDX) capability. Further, in both high and low voltage SEMs, the time to load samples into the SEM and pump down the load-lock chamber containing the SEM is relatively long, thereby slowing down wafer processing.

EDX technology also suffers in that only elemental information, not molecular structure information, is obtained about the bombarded surface. For example, EDX technology determines that the bombarded surface is composed of, for example, carbon. However, no information is gleaned as to whether the surface is diamond, graphite, or carbon dust. EDX technology also does not provide enough signal amplitude to analyze very light elements such as hydrogen. EDX technology is also limited to particulates of over a micron or more in size unless the particulate is a high Z material. In the industry, there is currently a need to analyze much smaller particles.

Some major semiconductor producers use systems which include both low and high voltage SEMs. However, such systems are relatively expensive, require a time consuming vacuum pump down, and still lack the ability to analyze molecular structures or sub-micron particles.

The semiconductor processing industry also uses infrared spectroscopy which operate on the principle of absorption. Since the wavelength at which a sample absorbs is a function of the sample material, the sample material is determined from the absorption spectrum.

Infrared absorption devices have a relatively large spot size due to the relatively long wavelengths of infrared light. Thus, the resolution is too imprecise to detect sub-micron defects.

One device which overcomes many of these problems is described in commonly owned U.S. Pat. No. 5,479,252 ("'252 device"), filed Jun. 17, 1993, issued Dec. 26, 1995, and entitled "laser imaging system for inspection and analysis of sub-micron particles". The '252 patent is incorporated herein by reference in its entirety. The '252 device uses confocal laser scanning microscopy to image a sample.

The '252 device has many advantages over the prior art but has no provision for spectroanalyzing the molecular structure of the sample. Thus, if spectral analysis is desired, the wafer needs to be transported to a separate spectral analysis system.

Therefore, a system which generates scanned images and reduces the amount of time between imaging and spectral analysis is desired.

SUMMARY OF THE INVENTION

According to the invention, a system for analyzing an object has two operating modes such as a scanned imaging mode and a stop scan spectral analysis mode. Also according to the invention are methods of providing and using the system. The system includes a laser light source capable of radiating laser light. A beam scanner is optically coupled to the laser light source to receive beams radiated from the laser light source. The beam scanner scans the beam during scanned imaging mode and outputs the beam towards the analyzed object. A lens (e.g., an objective lens) is optically coupled to the beam scanner to receive beams scanned by the beam scanner and to focus such beams on the analyzed object. A sensor, such as a photomultiplier ("PMT"), is optically coupled to the lens to receive laser light source beams that are reflected from the object driving the scanned imaging mode. Another sensor, such as a CCD camera, may detect characteristics of the beam such as color and intensity. A spectrometer is optically coupled to the objective lens to receive laser beams reflected from the object during the stop scan spectral analysis mode. The spectrometer defines wavelength spectrum characteristics for beams so received.

Thus, the object may be imaged and the molecular structure of the object simultaneously analyzed using an integrated system. This allows substantial time savings over conventional systems. The principles of the present invention will best be understood in light of the following detailed description and drawings.

DETAILED DESCRIPTION OF EMBODIMENTS OF THE INVENTION

A dual mode integrated laser imaging and spectral analysis system according to the invention is used to view and analyze defects on a workpiece such as a semiconductor wafer. The system uses confocal laser scanning microscopy when operating in scanned imaging mode. Furthermore, defect spectral analysis uses a computer controlled spectrometer optically coupled to the confocal microscope when operating in stop scan spectral analysis mode.

Figure 1:
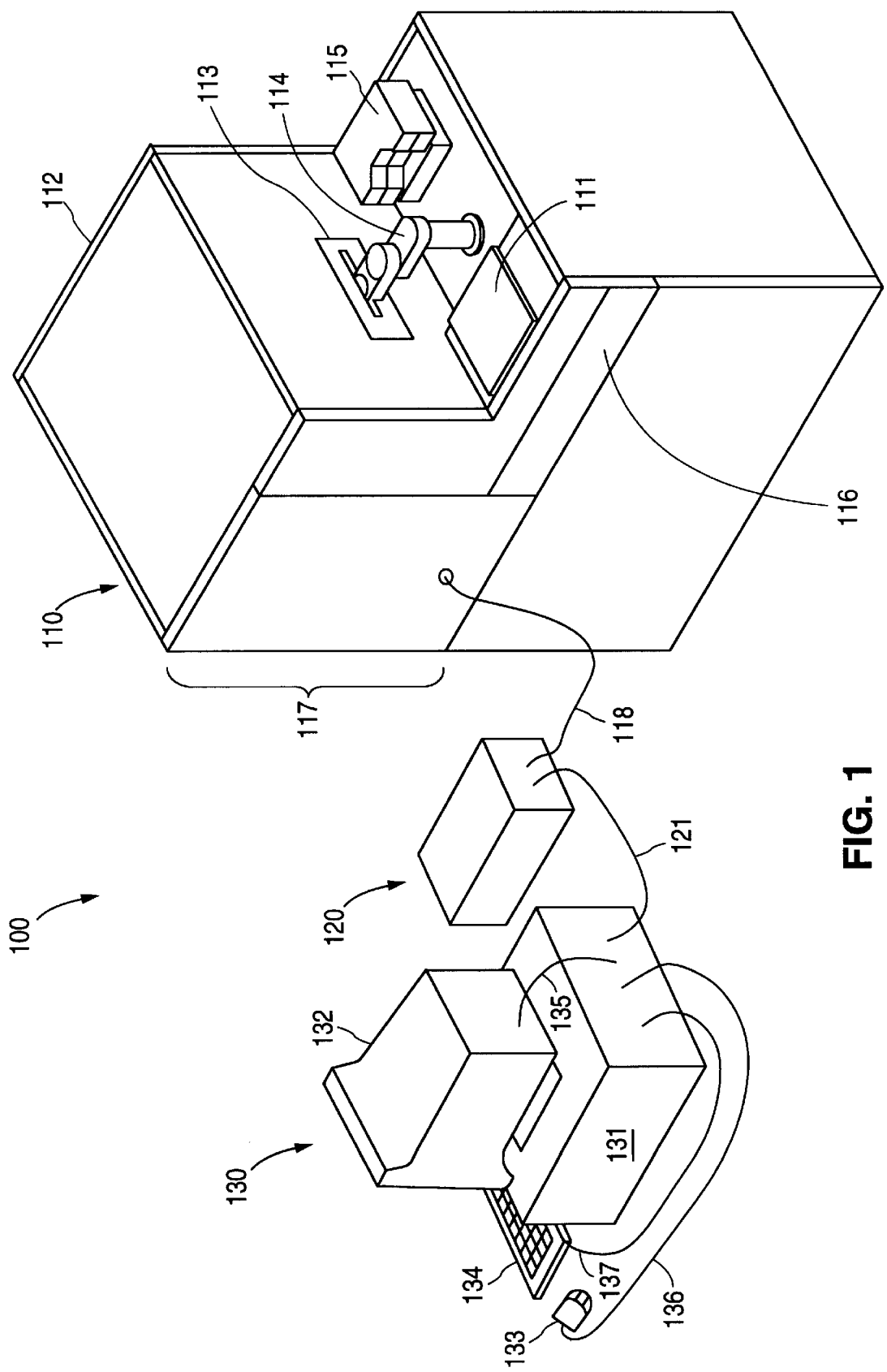
FIG. 1 is a perspective view of an integrated laser imaging and analysis system according to the present invention.

FIG. 1 is a perspective view of integrated laser imaging and analysis system 100 (hereinafter, "system 100") according to the invention. System 100 includes a main unit 110, a spectrometer 120 and a computer 130 which are intercon- nected. Main unit 110 performs confocal microscopy on a workpiece (e.g., a wafer) which is loaded into main unit 110 for analysis. Main unit 110 also includes a computer for controlling the confocal microscopy and for selectively providing light reflected by the wafer through an optical fiber to spectrometer 120. Spectrometer 120 generates raw data representing a wavelength spectrum of the light from main unit 110. Computer 130 analyzes the wavelength spectrum to determine the molecular structure of the sampled material.

Main unit 110 includes a stainless steel housing 112 and occupies a footprint which fits under a 48" standard clean hood. Main unit 110 has controlled internal airflow. Clean air from the cleanroom (e.g., a class 1 cleanroom) is drawn in through the top of main unit 110 and exhausted from main unit 110 outside of the cleanroom. Thus, class 1 conditions are maintained in the wafer area which is isolated from the operator consoles (not shown) of main unit 110.

An optical fiber 118 optically couples main unit 110 and spectrometer 120. Spectrometer 120 analyzes the optical signals received through optical fiber 118 in response to instructions issued from computer 130 over a cable 121. These instructions may be generated by a user using input devices such as a mouse 133 or a keyboard 134 or may be automatically generated by software within a computer processing unit 131. Spectrometer data is provided back to computer processing unit 131 which processes the data and relays the data over a cable 135 to display 132. Although main unit 110 and computer 130 are separate standing units in FIG. 1, these units may be physically integrated using conventional techniques. A software package for controlling the analyses and display of the spectral data is available from Instrument S.A. of Edisen, N.J., under the title "Labspec".

A cassette of wafers (not shown) of a given diameter from, for example, 150 mm (i.e., "6 inch wafer") to 200 mm (i.e., "8 inch wafer"), is positioned on cassette platform 111. There is a different cassette size for each size of wafers. One of a set of interchangeable mounting plates (not shown), there being a different mounting plate for each cassette size, is attached to cassette platform 111. For 300 mm (i.e. "12 inch"), a special loading station (not shown) is needed. A loading station for use with the present invention is available from Asyst Technologies Inc. in Fremont, Calif. as model 300 millimeter front-load (part number 9700-4454-01). Typically, defects have previously been identified on the wafers by a defect detecting system, as described above. A wafer from the cassette is passed through wafer door 113, into a wafer processing area housed by an optics housing section 117 of housing 112. Wafer door 113 is used to exclude room light from the optics within housing 112. Wafer door 113 also has an interlock features which disables laser 201 when wafer door 113 is open, thereby preventing stray laser light.

The wafers are loaded, and removed after inspection, by a robot 114. Robot 114 is available from Equipe Technologies in Calif. as part number ATM-104-1. Robot 114 reliably senses, loads, and unloads wafers from cassettes, interchangeably handling 150 mm to 300 mm diameter wafers. Robot 114 (and other components of main unit 110) is designed to eliminate any wafer contamination thus maintaining class 1 cleanliness. Robot 114 has utility backup (power, air, vacuum) to protect any wafer in transit on robot 114 from damage.

When loading a wafer, robot 114 removes the wafer to be loaded from cassette platform 111 and performs a pre-alignment step, using a pre-aligner 115 which senses a notch and/or flat(s) on the wafer. After pre-alignment, the wafer is loaded into the wafer processing area through wafer door 113 onto the optical unit's XYZ-stage 240. In this description, a Cartesian coordinate system is used in describing various aspects of the system. The X and Y axes define a plane parallel to the patterned surface of the wafer and the Z-axis is perpendicular to the patterned surface of the wafer.

While the wafer is being loaded, a file of data from the defect detecting system, specifying the wafer coordinates of the detected defects, is transferred to a main unit computer 220 (FIG. 2) within housing 112 either by diskette or other media, or by communication via a link or network such as Ethernet or RS232. In the preferred embodiment, a computer for use with main unit 110 is available from Silicon Graphics in Mountain View, Calif. as part number SGI W24C-1632. In addition, in the preferred embodiment, a disk drive, available from Silicon Graphics in Mountain View, Calif. as part number P3-F252, and tape drive, available from Hamilton/Avnet in Mountain View, Calif. as Maynard (Archive) 21501S, are attached within a disk drive bay 116 of housing 112. Of course, other types of computers, disk drives, tape drives, or "mass storage" devices can also be used in the system of this invention if desired.

System 100 includes a laser scanning microscopic optics module 200 (hereinafter, "optics module 200") shown in FIG. 2. In the embodiment shown in FIG. 1, all of optics module 200 is positioned within main unit 110 except for optical fiber 118, optical coupler 238, spectrometer 120, and cable 121. However, in other embodiments, the optical fiber 118, optical coupler 238, spectrometer 120, and cable 121 are integrated within main unit 110.

Optics module 200 includes confocal laser beam-scanning optics, and photo detection electronics, together with commercial microscope components to achieve high quality real time confocal images while in scanned imaging mode. System 100 produces a complete XY-scanned laser image, in a single plane of focus, at video rates. The resulting image is displayed on a high resolution monitor in real time. Thus, the operator can scan through different levels of focus in real time, as with a conventional microscope. In stop scan spectral analysis mode, optics module 200 spectroanalyzes the molecular structure of a portion of the workpiece W. The operation of optics module 200 during scanned imaging mode and stop scan spectral analysis mode are described hereinafter.

Scanned Imaging Mode

Optics module 200 uses the basic principles of confocal microscopy, in which illuminating light passes through a pinhole aperture, and the image of this pinhole is then cast by the system optics on workpiece W. The light scattering from workpiece W returns through the system optics to a camera 230 and/or to a photomultiplier ("PMT") 231. Only light from the focal plane of the imaging (objective) lens returns through the pinhole aperture.

A laser 201 can radiate laser light at discrete wavelengths such as 488 nm. An example of a laser that is used with the invention to analyze, for example, a patterned semiconductor wafer is the Model 2011-30SL air-cooled 488 nm single wavelength argon ion laser produced by Uniphase Corporation, San Jose, Calif. Other wavelength lasers (such as Helium-Neon or Helium Cadmium) could also be used to supply laser light at other wavelengths.

The laser light from laser 201 passes through a single mode polarization preserving optical fiber 202 having a core size of 3 to 10 microns. An example of an optical fiber that is used with the invention is part number FDS-AP2S4880.7 supplied by Point Source of Hampshire, England. A fiber coupler 203 mechanically and optically connects optical fiber 202 with laser 201 while a fiber coupler 204 collimates the laser light. An example of fiber couplers that is used in the invention is included with the delivery of the fiber supplied by Point Source. The flexibility of optical fiber 202 allows laser 201 to be flexibly positioned within system 100 (FIG. 1).

The collimated laser light from fiber coupler 204 passes through a laser attenuator 205 which allows the laser light intensity to be adjusted. A laser attenuator for use with the invention is available from Melles Griot of Irvine, Calif. as part number 03FPG003. Other laser attenuators are available from the same source for other wavelengths.

The laser light having the selected wavelength(s) passes laser attenuator 205 to a polarizing beam splitter cube 206. Polarizing beam splitter cube 206 is attached to laser attenuator 205 using conventional optics mounts and is configured to reflect light only of the proper polarization. The polarization of the laser light emitted from laser 201 is oriented, as conventionally known, so that as much as possible (i.e., most) of the laser light is reflected by polarizing beam splitter cube 206 at 90 degrees into the focusing optics 209 of a spatial filter 208. A small portion of the laser light passes through polarizing beam splitter cube 206 to a beam dump mounted behind polarizing beam splitter cube 206, where the laser light is absorbed. An example of a polarizing beam splitter cube that is used with the invention is available from Melles Griot of Irvine, Calif. as part number 03PBB003.

Spatial filter 208 consists of focusing optics 209 which focuses the laser light through a pinhole aperture 210. The diameter of pinhole aperture 210 is selected according to well-known techniques to allow easy alignment of the laser beam and to allow a significant amount of the laser light to pass through pinhole aperture 210. An example of a spatial filter for use with the invention is available from Newport Corporation of Irvine, Calif. as Compact Spatial Filter Model 910. Spatial filter 208 is attached to polarizing beam splitter 206 by conventional optics mounts.

The diverging laser light from pinhole aperture 210 passes through a collimator lens 211 to direct collimated laser light into a plasma line filter 212. Plasma line filter 212 filters out laser light of unwanted parasitic plasma line wavelengths associated with each desired wavelength emitted by laser 201. The light from plasma line filter 212 passes into an X-Y beam scanner 213 for scanning the light along the X and Y directions on workpiece W. X-Y beam scanner 213 includes an x-mirror 214 (and y-mirror 216) actuated by an x-direction motor 215 (and y-direction motor 217) for scanning the beam in the x-direction (and y-direction). An X-Y beam scanner for use with the invention is available from General Scanning of Watertown, Mass. as part number 000-3011003. X-Y beam scanner 213, plasma line filter 212 and collimator lens 211 are attached to each other and to spatial filter 208 by conventional optics mounts. Main unit computer 220 conventionally actuates x-direction motor 215 and y-direction motor 217 over control line 236 to raster scan 256 or 512 lines at approximately 26 or 13 frames per second, respectively.

This raster pattern is imaged in space by a scan lens 218. A scan lens for use with the invention is available from Applied Optics of Pleasanton, Calif. as part number 000424. Scan lens 218 is attached to X-Y beam scanner 213 by conventional optics mounts.

The rastered laser light from scan lens 218 is incident on a beam splitter 219 which directs a portion of the laser light to a tube lens 222. A small portion of the laser light passes through beam splitter 219 to a beam dump 221 mounted behind beam splitter 219, where the light is absorbed. Beam splitter 219, beam dump 221 and tube lens 222 are attached to each other and to scan lens 218 using conventional optics mounts.

Tube lens 222 collimates the raster scanned light onto a quarter wave plate 223. A tube lens for use with the invention is available from Olympus of Japan as part of their vertical illuminator model 5LM220.

Quarter wave plate 223 is attached to tube lens 222 using conventional optics mounts and is positioned to convert the linearly polarized laser light to circularly polarized laser light. A quarter wave plate for use with the invention is available from Meadowlark Optics of Frederic, Colo. as part number NRQ-100-488-LE60.

The laser light then passes through a bright field or dark field cube 224 ("BF/DF cube 224") which is connected to tube lens 222 with conventional optics mounts. A dark field cube is useful for imaging abrupt topographic changes or particulates. Otherwise, a bright field cube is used. The bright field and dark field cube are both mounted on a conventional computer controlled switchable mount. In addition to laser light, BF/DF cube 224 receives white light from an illuminator 239, having, for example, a halogen lamp, and reflects the white light 90 degrees toward workpiece W. Thus laser light and white light are incident on workpiece W. White light generated by a halogen lamp includes a wavelength spectrum close to that of the sun within the visible range. Thus white light reflected off a surface of, for example, workpiece W appears natural and in full color to a viewer just as if that surface was exposed to the sun. An example of a bright field (or dark field) cube that is used in the present invention is part number ML0897 (or ML0898 for the dark field cube) supplied by Olympus of Japan. An example of a white light illuminator that is used in the invention is part number 5LM220 supplied by Olympus of Japan. The image of the light spot is focused and de-magnified by objective lens 226 in the focal plane of objective lens 226. An objective lens for use with the invention is available from Olympus of Japan as part number 1-LM590. Many interchangeable lenses are available. Objective lens 226 is mounted on a motorized turret 225, controlled by computer 220 over line 237, that enables automatic changing of objective lenses. A turret for use with the invention is available from Olympus of Japan as part number BL0920. Turret 225 is designed to accommodate three to six objective lenses, and can handle low power (magnifications of 5, 10 and 20 times actual size) as well as medium power (magnification of 50 times actual size) and high power, high N.A. (numerical aperture, a conventional designation for the light gathering property of an objective lens in which higher numbers indicate a broader cone of gathered light) objective lenses (magnifications of 100 and 150 times actual size and .95 N.A.). Turret 225 and a vertical illuminator containing a tube lens as a standard component are mounted together with a flange and held by a locking screw. The turret/illuminator assembly bolts to the optics baseplate.

According to the principles of confocal imaging, the laser light striking workpiece W is scattered and a portion of the laser light along with white light is reflected back into objective lens 226, returning through the optical path described above. As the returning light passes through quarter wave plate 223, the returning laser light is converted from light circularly polarized to light linearly polarized and 90° out of phase with respect to the polarization of the light originally emitted by laser 201. The light continues back along the path through tube lens 222.

Part of the light from tube lens 222 passes through beam splitter 219 unreflected. This light passes through a holographic notch filter 228 which filters out the frequency of the original laser light. An example of a holographic notch filter which is used in the invention is part number HNPF-488-1 supplied by Kaiser Optical located in Ann Arbor, Mich. Holographic notch filter 228 is connected to beam splitter 219 using conventional optics mounts.

In the scanned imaging mode, a turning mirror 227 is turned out of the way of the light (by computer 220 as instructed over line 241) so that the light is received by camera 230 through a video coupler 229. Video coupler 229 is optically coupled to camera 230 and holographic notch filter 228 so that the light is focused onto the photosensitive components of camera 230. An example of a video coupler for use with this invention is part number HRP100-ENG12 supplied by Diagnostic Instruments located in Sterling Heights, Mich. An example of a camera for use with this invention is model number DXC-950 supplied by Sony of Japan.

Some light from tube lens 222 is reflected by beam splitter 219 back through scan lens 218, and is reflected by mirrors 216 and 214 of X-Y beam scanner 213. This reflected light returns through plasma line filter 212 and collimator lens 211 which focuses the light to pinhole aperture 210 of spatial filter 208. If the light spot was in focus on the workpiece W, the image is imposed on pinhole aperture 210. If the light spot was out of focus on the workpiece W, very little light returns through pinhole aperture 210. Consequently, signals in the confocal optics get darker, not merely blurred, as occurs with conventional optics, when the sample is out of focus. Thus, system 100 autofocuses until maximum light intensity is sensed. Light which passes through pinhole aperture 210 reaches polarizing beam splitter 206, which, being oppositely polarized, passes through polarizing beam splitter 206 undeviated and is imaged on a PMT 231.

By measuring the light intensity at each XY location of the raster scan, a map of light intensity in the focal plane of objective lens 226 is constructed. This map can be stored in the memory of main unit computer 220 and/or analyzed by a processor in main unit computer 220, which stores the readings, and makes a comparison of the intensity with previously stored maps from other scans. The light intensity map is also written directly into the video memory of main unit computer 220 and may be displayed live on the computer display.

The above describes one of two operating modes of system 100, the scanned imaging mode. The other operating mode is the stop scan spectral analysis mode which is the same as the scanned imaging mode except as described herein.

Stop Scan Spectral Analysis Mode

In stop scan spectral analysis mode, main unit computer 220 instructs motors 215 and 217, over line 236, to deactivate so that the laser light from X-Y beam scanner 213 is not scanned.

The non-scanned laser light is focused by objective lens 226 onto a specified location of workpiece W. Also, white light illuminator 239 is in dark field mode and the halogen lamp is operating at only 3 volts in order to minimize the white light impact on spectrum acquisition. Turning the halogen lamp off completely for stop scan spectral analysis mode may wear the halogen lamp much more than just turning the intensity down.

The wavelength of the laser light incident on workpiece W is of the specific wavelength (e.g., 488 nm). Thus, almost all of the laser light reflected from workpiece W is of the same wavelength as the incident laser light. However, due to well-known Raman effects, the reflected laser light also includes a low intensity laser light of a wavelength below the incident wavelength and another low intensity laser light of a wavelength above the incident wavelength. If the incident light photon donates energy to workpiece W, the reflected light photon has less energy, a lower frequency, and a longer wavelength than the incident laser light. If the incident light photon receives energy from workpiece W, the reflected light photon has more energy, a higher frequency, and a shorter wavelength than the incident laser light.

This shifting of wavelengths is commonly referred to as "wave number shift" or "Raman shift". Regardless of the original laser wavelength, the Raman shift resulting in the reflected laser light is only a function of the material. For materials encountered in semiconductor fabs, the Raman shift ranges from 200 cm$^{-1}$ to 4000 cm$^{-1}$. The Raman shift due to reflection off crystalline silicon is approximately 520 cm$^{-1}$.

The light reflected from workpiece W returns through objective lens 226, BF/DF cube 224, quarter wave plate 223, and tube lens 222. Some light from tube lens 222 passes through beam splitter 219 unreflected. This light is reflected by turning mirror 227 which is turned, as instructed over a line 241 by main unit computer 220, so that turning mirror 227 reflects the light towards a tube lens 232. Turning mirror 227 is a conventional mirror which is attached to beam splitter 219 using conventional optics mounts.

Tube lens 232 receives and collimates the light reflected by turning mirror 227. A tube lens for use with the invention is supplied as part number TLA-100 by Scientific Instrument Company. Tube lens 232 is attached to turning mirror 227 using conventional optics mounts.

The collimated light is received by a holographic super notch filter 233 which filters out most of the laser light of the original laser wavelength. Although wavelengths of some of the laser light changes when reflecting off of workpiece W, the laser light of the original wavelength is still 6 to 8 order of magnitude more intense than laser light of the altered wavelengths. By filtering out laser light of the original wavelength, it is easier to spectroanalyze the altered wavelengths. A holographic super notch filter for use with the invention is part number HNSF-488-1 supplied by Kaiser Optical of Ann Arbor, Mich. Holographic super notch filter 233 is attached to tube lens 232 using conventional optics mounts.

An objective lens 234 receives the light from holographic super notch filter 233 and focuses the light towards optical coupler 235. An example of an objective lens for use with the invention is a 6.3x objective lens having part number 040AS008 supplied by Melles Griot of Irvine, Calif. Objective lens 234 is attached to holographic super notch filter 233 using conventional optics mounts.

Optical coupler 235 receives and channels the focused light into optical fiber 118 (FIGS. 1 and 2) and out of main unit 110 (FIG. 1). Optical fiber 118 (FIGS. 1 and 2) has a small core size of, for example, 50 microns with two SMA adapters 235 and 238 attached at both ends. An optical fiber for use with the invention is part number INS01-010 of Media Optics, Inc. of Glendale, Ari. Optical coupler 235 is attached to objective lens 234 using conventional optics mounts.

Figure 2:
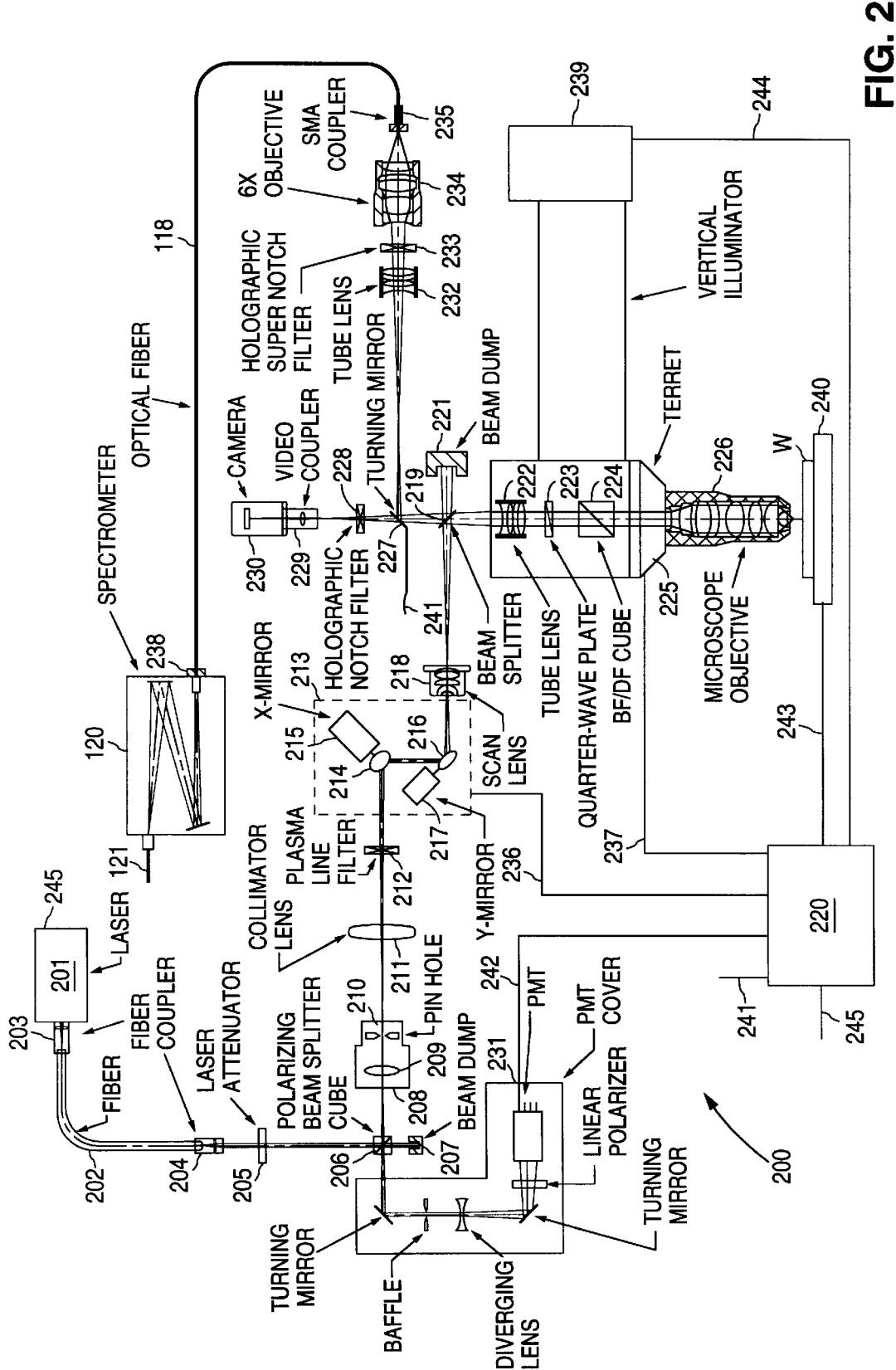
FIG. 2 is a schematic diagram of an optics module of the system of FIG. 1.

The light from optical fiber 118 (FIGS. 1 and 2) is received through optical coupler 238 into spectrometer 120 (FIGS. 1 and 2). Optical coupler 238 is used to both mechanically and optically connect optical fiber 118 and spectrometer 120. A spectrometer for use with the invention is the model INDURAN supplied by Instrument S.A. of Edisen, N.J.

Since the laser light is imaged on workpiece W through pinhole aperture 210, the receiving fiber 118 (e.g., 50 microns core size) acts as a receiving pinhole for light reflected off of workpiece W. Thus, system 100, in stop scan spectral analysis mode, forms a confocal Raman system. This reduces the effect of fluorescent light on the Raman spectrum acquisition. Also, because system 100 is confocal, the acquired spectrum is depth sensitive and can provide depth information about workpiece W.

Referring to FIG. 1, spectrometer 120 provides raw data representing the wavelength spectrum of the light provided through optical fiber 118. This raw data is written over line 121 to computer 130 for processing. Since the value of the incident laser light $\lambda$ is known, processing unit 131 determines the Raman shift (in cm$^{-1}$)

Once the Raman shift is computed, the sample material is determined by manual or computerized reference to a table for correlation to a material. Table (1) shows a sample table correlating the Raman shift to a molecular structure.

TABLE 1

| MOLECULAR STRUCTURE | RAMAN SHIFT (IN CM$^{-1}$) |
|---|---|
| Crystalline Silicon | 520 |
| Quartz | 470 |
| Tungsten Silicide | 330 and 450 |
| Disordered Carbon | 1360 and 1580 |

In one embodiment, the Raman shifts are compared to a Raman spectral library. These Raman spectral libraries contain Raman shifts and relative amplitudes of Raman shifted spectral peaks for each material. Raman spectral libraries are available from, for example, Nicolet of Madison, Wis. Although these libraries contain Raman shift data for a wide variety of materials, they typically do not include Raman data for all materials of interest in semiconductor wafer inspection. The spectral libraries may be augmented to cover all materials of interest.

In order to add new spectrum data to the library of a material of interest, the user may first determine match tolerances for the chemical by sampling the material, for example, ten times. For each chemical, more than one spectrum is needed to provide statistically meaningful data for the spectral variability of the sample. Each set of spectrum for a given chemical should be collected from as pure a sample as possible. Of course, getting a pure sample of a material in the production environment can be difficult, since the chemical may be a byproduct of a process step. Furthermore, even with a pure sample, the spectrum collected may contain extra peaks of no interest, may have significant peaks at lower intensity, or it may have peaks slightly shifted. These sample imperfections are typical and expected, and may be compensated for by the manual task of identifying the region of interest and setting peak priorities. For example, the spectra of polystyrene, in addition to having a CH stretching peak close to 3000 cm$^{-1}$ and a polystyrene unique peak close to 1650 cm$^{-1}$, also contains a large number of strong peaks at the spectral region of 200 to 1500 wave number. The peaks in this region are generally of little significance, and the library search is simpler if they are excluded.

A material is sampled in its pure state and may be sampled at various concentrations to obtain a better statistical variation of the Raman shift of the sample. The mean, median, standard deviation and other statistical parameters of the sample may be used to determine match tolerances. For example, if one of the Raman shifted spectral peaks has a Raman shift, amplitude, and/or relation with other Raman shift spectral peaks within a predetermined range defining a given material, then that material is displayed as being a possible material match.

In some cases, several possible material matches may be found. Memory may store image data corresponding to each Raman shift material. For each possible match, a stored image (e.g., white light, confocal, or scanning electron microscope) of each possible match may also be displayed to allow the user to visually determine which of the possible matches is the actual sample material.

Once the spectral data for the added material is entered, the user may be asked to set spectral peak priorities. For example, if a material of common use in the industry (e.g., sulphuric acid) corresponds to several Raman shifted spectral peaks, then the appearance of these several Raman shifted spectral peaks may be assigned a high priority. For example, many polymers have CH bonds. Thus, a sample spectra having CH peaks (at around 3000 wave number) can be used to identify the sample to be one of a group of materials that have CH bonds (i.e., "CH group") such as polymers. However, because the CH group is large, the identification of the presence of CH peaks is not very useful in itself. However, the fact that a sample is identified to be one of the CH group is useful information for further identification. For example, the chemical polystyrene has the CH peak as well as another polystyrene unique peak (around 1650 wave number). After the CH peak is found, the system can search and find the polystyrene peak, even when the polystyrene peak is weak, at noise level. If, on the other hand, the polystyrene is identified by its unique peak alone, the peak's intensity has to be above noise level.

Rather than identifying a sample to a unique material, in some cases, it may only be possible to identify the sample to a given group of materials which share a common spectrum. The user may use other information (e.g., a visual inspection of the sample) to determine the specific sample material.

The system may also provide a list of chemicals that may be ignored if such chemicals are never encountered or are of little interest in a given application. On the other hand, the system may limit the search to specified materials when such materials are of greater significance to the user.

In addition to identifying materials, system 100 may generate a signal if a particular material is found. For example, system 100 may give an alarm if a hazardous material is detected.

Thus, the present invention allows for laser beam scanning and spectral analysis in a single system.

Various embodiments of the invention have been described. The descriptions are intended to be illustrative, not limiting. Thus, it will be apparent to one skilled in the art that certain modifications may be made to the invention as described without departing from the scope of the claims set out below.

We claim:

1. A system for analyzing an object, the system having first and second operating modes, the system comprising:
   a laser operable to radiate a beam of radiation;
   an objective lens operable to focus the beam on the object and gather radiation reflected from the object;
   a beam scanner optically coupled to the laser to receive the beam from the laser, the beam scanner configured to output the beam towards the objective lens, the beam scanner configured to scan the beam in the first operating mode;
   a reflector system operable to direct at least a portion of the radiation reflected from the object along a first return path in the first operating mode, the reflector system being further operable to direct at least a portion of the radiation reflected from the object along a second return path in the second operating mode;
   a sensor positioned in the first return path, the sensor being configured to detect intensity levels of the radiation reflected from the object in the first operating mode;
   a spectrometer having a radiation reception portion positioned in the second return path, the spectrometer being configured to define wavelength spectrum characteristics of the radiation reflected from the object in the second operating mode;
   an aperture optically coupled between the laser and the objective lens, the aperture being positioned in the first return path between the reflector system and the sensor, the aperture being positioned outside the second return path.

2. The system of claim 1, wherein the radiation reception portion of the spectrometer comprises an optical fiber having a first end positioned in the second return path, the optical fiber having a second end optically coupled to a body of the spectrometer, wherein the optical fiber has a diameter such that the optical fiber acts as a pinhole aperture for the beam reflected from the object, whereby the system uses principles of confocal microscopy in the second operating mode.

3. The system of claim 2, wherein the spectrometer and the second return path are configured to obtain Raman spectra from sub-micron particles on the object and from particles made of low molecular weight materials in the second operating mode.

4. The system of claim 1, further comprising a white light illuminator optically coupled to the objective lens so as to illuminate white light onto the object, wherein the sensor receives at least a portion of the white light reflected from the object.

5. The system of claim 1, wherein the laser is configured to radiate laser light primarily of a single wavelength in the second operating mode, the system further comprising a holographic notch filter optically coupled between the objective lens and the spectrometer so as to filter out light of the single wavelength in the second operating mode.

6. The system of claim 1, wherein the reflector system comprises a turning mirror.

7. The system of claim 1, wherein the reflector system comprises a beam splitter operable to generate first and second beam portions from the radiation reflected from the object, the beam splitter being configured to direct the first and second beam portions along the first and second return paths, respectively, the first return path overlapping a beam path from the laser to the object, the second return path being separate from both the first return path and the beam path from the laser to the object, the beam splitter being further operable to direct a portion of the beam of radiation from the laser to the object.

8. The system of claim 7, wherein the reflector system further comprises a movable mirror system positioned in the second return path in the second operating mode, the movable mirror system being positioned to direct the second beam portion to the radiation reception portion of the spectrometer in the second operating mode.

9. The system of claim 8, further comprising:

a white light illuminator optically coupled to the objective lens so as to illuminate white light onto the object; and a camera positioned in a third return path, the camera being operable to receive white light from the object and to generate image component signals from the white light received from the object;

wherein the movable mirror system is operable to direct the second beam portion to the camera in the first operating mode.

10. A method for analyzing an object, the method comprising:

focusing a beam of laser light on a pinhole aperture;

receiving the beam from the pinhole aperture into a beam scanner;

scanning the beam with the beam scanner in a first operating mode;

focusing the beam from the beam scanner on the object;

directing at least a portion of the beam after reflection from the object along a first return path in the first operating mode;

directing at least a portion of the beam after reflection from the object along a second return path separate from the first return path in a second operating mode;

receiving the beam portion directed along the first return path at the pinhole aperture;

sensing an intensity of light admitted by the pinhole aperture in the first operating mode; and spectroanalyzing the beam portion directed along the second return path in the second operating mode.

* * * * *